United States Patent
Coady et al.

(10) Patent No.: US 9,534,086 B2
(45) Date of Patent: Jan. 3, 2017

(54) METHODS OF FORMING POLY(ARYL ETHER SULFONE)S AND ARTICLES THEREFROM

(71) Applicant: International Business Machines Corporation, Armonk, NY (US)

(72) Inventors: Daniel J. Coady, San Jose, CA (US); Jeannette M. Garcia, San Jose, CA (US); James L. Hedrick, Pleasanton, CA (US); Hans W. Horn, San Jose, CA (US); Gavin O. Jones, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 14/272,256

(22) Filed: May 7, 2014

(65) Prior Publication Data

US 2015/0322209 A1 Nov. 12, 2015

(51) Int. Cl.
*C08G 75/23* (2006.01)
*C08K 7/24* (2006.01)
*B33Y 70/00* (2015.01)

(52) U.S. Cl.
CPC ............... *C08G 75/23* (2013.01); *B33Y 70/00* (2014.12); *C08K 7/24* (2013.01)

(58) Field of Classification Search
CPC ...................................................... C08G 75/23
See application file for complete search history.

(56) References Cited

U.S. PATENT DOCUMENTS

| | | | | |
|---|---|---|---|---|
| 4,474,932 A | * | 10/1984 | Bier | C08G 65/4087 528/125 |
| 4,705,843 A | | 11/1987 | Stammann et al. | |
| 4,957,978 A | * | 9/1990 | Harris | C08L 81/06 525/390 |
| 6,235,871 B1 | | 5/2001 | Singer et al. | |
| 2009/0295042 A1 | * | 12/2009 | Pfister | B29C 67/0077 264/497 |
| 2011/0263729 A1 | | 10/2011 | Hermanutz et al. | |
| 2013/0109831 A1 | | 5/2013 | Lutz et al. | |

FOREIGN PATENT DOCUMENTS

| | | |
|---|---|---|
| WO | 2004072168 A2 | 8/2004 |
| WO | 2012109212 A2 | 8/2012 |

OTHER PUBLICATIONS

Cureton, LT., "Modified Poly(arylene ether sulfone) Compositions and their Segmented Block Copolymers," Thesis, Virginia Polytechnic Institute and State University, Nov. 4, 2010.
Zhang, B., "Synthesis and Characterization of trans-1,4-Cyclohexylene Ring Containing Poly(arylene ether sulfone)s," Thesis, Virginia Polytechnic Institute and State University, Jan. 13, 2012.
Chung, et al., "Poly(arylene ether)s via Nitro Displacement Reaction: Synthesis of Poly(biphenylene oxide)s Containing Trifluoromethyl Groups from AB Type Monomers", Macromolecules, 2000, 33 (26), pp. 9474-9476, first page (abstract); puclished Dec. 19, 2000.
Kricheldorf, "Silicon in Polymer Synthesis", H. R. Kricheldorf, Ed., Springer-Verlag, Berlin, 1996, Chapter 5, "Polycondensation of Silylated Monomers".
Satpathi, Hirak, "Novel phosphorus containing poly(arylene ethers) as flame retardant additives and as reactant in organic synthesis", Dissertation, Technical University of Dresden, May 15, 2015.
Vogel, et al., "Catalytic Cs2CO3 Promotes "Silyl Method"—Type Polycondensation", Open Journal of Polymer Chemistry, 2012, 2, 1-5.

* cited by examiner

*Primary Examiner* — Michael Pepitone
(74) *Attorney, Agent, or Firm* — Michael R. Roberts

(57) ABSTRACT

A poly(aryl ether sulfone) of low polydispersity containing no detectable cyclic polymer byproduct was prepared by melt polymerization without catalyst, solvent, and base. The poly(aryl ether sulfone) can be used without further purification for the manufacture of articles. A melt composition for fabricating an article comprises the poly(aryl ether sulfone) and, optionally, one or more additives.

21 Claims, 2 Drawing Sheets

METHODS OF FORMING POLY(ARYL ETHER SULFONE)S AND ARTICLES THEREFROM

BACKGROUND

The present invention relates to methods of forming poly(aryl ether sulfone)s and articles therefrom, and more specifically to methods of forming poly(aryl ether sulfone)s by melt polymerization.

Poly(aryl ether sulfone)s are highly-utilized, tough, ductile thermoplastics that have the advantage of solubility in organic solvents and are therefore processable. In addition, they can be mixed with other monomers in order to form random copolymers, a technique that often improves the mechanical properties of the poly(aryl ether sulfone) while maintaining its solubility. Due to their resistance to oxidation and hydrolysis, they are produced for water purification membranes, acidic solid support resins, as well as medical devices. In industry, poly(aryl ether sulfone)s are used for a wide range of applications including composites, plumbing and electronics. Because poly(aryl ether sulfone)s contain polar sulfone functional groups, they can be mixed with dyes to produce colored plastics.

Poly(aryl ether sulfone)s have been prepared using stoichiometric quantities of potassium carbonate ($K_2CO_3$), a mild base, bisPhenol A (BPA) monomer, and a bis-haloaryl sulfone monomer (Scheme 1).

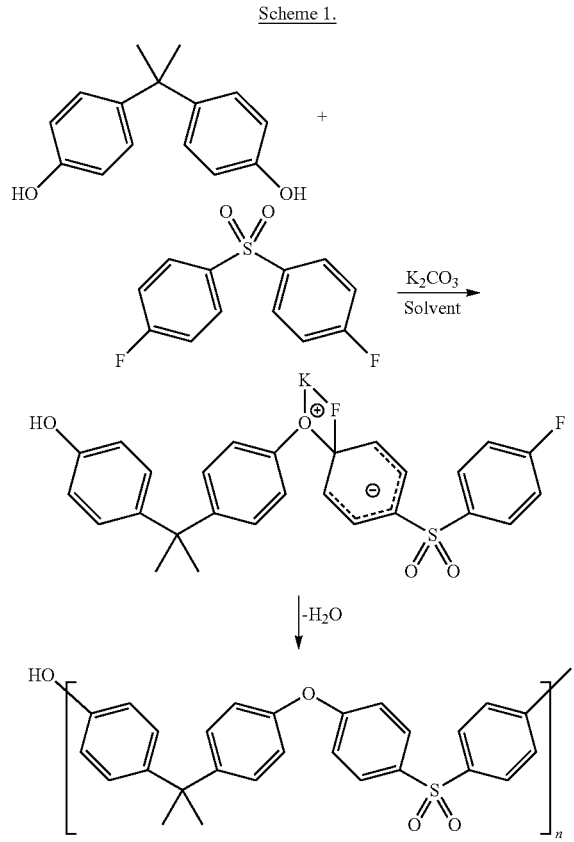

Scheme 1.

High reaction temperatures (>170° C.) are needed in order to remove the byproduct, water, from the reaction mixture. Due to high demand for these types of polymers for industrial processes, milder methods of synthesizing a poly(aryl ether sulfone) would be of high value. Efforts to improve the reactivity of aryl halides for the synthesis of poly(aryl ether sulfone)s include placing an activating group at the ortho-position of the aryl ring of the sulfone monomer in order to influence the formation of the Meisenheimer complex, the reactive intermediate in the formation of the aryl ether linkage (Scheme 1).

Another approach utilized a catalytic quantity of a metal fluoride (e.g., cesium fluoride) for activation of bis-TMS protected bis-Phenol A monomer, which resulted in addition of BPA to a di-haloaryl sulfone monomer. The reaction was successful without solvent, and effectively showed that fluoride was effective in activating the silicon group for nucleophilic transfer and formation of the Meisenheimer complex. The metal is a potential contaminant, and therefore a drawback in the large scale production of poly(aryl ether sulfone)s.

Another problem associated with the above methods of preparing poly(aryl ether sulfone)s is chemical "backbiting" of the polymer chain during chain growth, which leads to mixtures of cyclic and linear polymers of various molecular weights. In polycondensation reactions, the most probable polydispersity index (PDI) is about 2.0. A smaller PDI would be desirable.

Methods of producing more narrowly dispersed poly(aryl ether sulfone)s are needed, which do not employ a metal catalyst and do not produce a cyclic byproduct.

SUMMARY

Accordingly, a method is disclosed, comprising:
forming a first mixture comprising:
i) a silylated bis-phenol (first monomer) of formula (1):

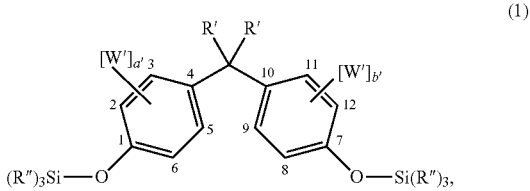

wherein
a' is an integer having a value of 0 to 4,
b' is an integer having a value of 0 to 4,
each W' is an independent monovalent radical selected from the group consisting of methyl, ethyl, methoxy, and ethoxy,
each R' is an independent radical selected from the group consisting of alkyl groups comprising 1 to 6 carbons and haloalkyl groups comprising 1 to 6 carbons, and
each R" is an independent alkyl group comprising 1 to 6 carbons, and ii) a bis-aryl sulfone (second monomer) of formula (2):

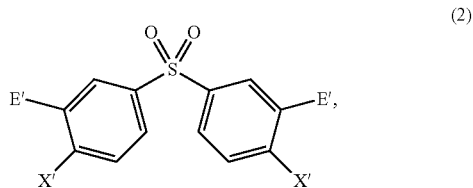

wherein
each E' is an independent electron withdrawing group selected from the group consisting of nitro (*—NO$_2$), cyano (*—CN), trifluoromethyl (*—CF$_3$), trichloromethyl (*—CCl$_3$), and alkylsulfones (*—S(=O)$_2$R$^a$), wherein R$^a$ is an alkyl or aryl group comprising 1 to 10 carbons, and
each X' is an independent leaving group selected from the group consisting of fluoride, chloride, bromide, iodide, trifluoromethoxy (*—OCF$_3$), trichloromethoxy (*—OCCl$_3$), and trifluoromethanesulfonyl (*—OS(=O)$_2$CF$_3$); and
heating the mixture with agitation at a temperature of about 150° C. to 300° C., thereby forming a second mixture comprising a poly(aryl ether sulfone).

Also disclosed is melt composition for forming an article, comprising:
the poly(aryl ether sulfone) prepared by the above-described method; and
one or more additives associated by non-covalent interactions with the poly(aryl ether sulfone).

Another method is disclosed, comprising:
forming a mixture comprising:
i) a silylated bis-phenol (first monomer) of formula (1):

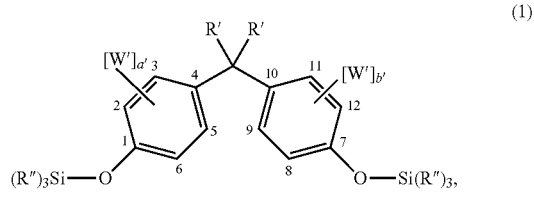

wherein
a' is an integer having a value of 0 to 4,
b' is an integer having a value of 0 to 4,
each W' is an independent monovalent radical selected from the group consisting of methyl, ethyl, methoxy, and ethoxy,
each R' is an independent radical selected from the group consisting of alkyl groups comprising 1 to 6 carbons and haloalkyl groups comprising 1 to 6 carbons, and
each R" is an independent alkyl group comprising 1 to 6 carbons,
ii) a bis-aryl sulfone (second monomer) of formula (2):

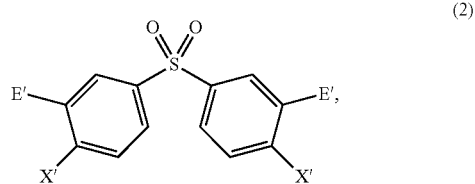

wherein
each E' is an independent electron withdrawing group selected from the group consisting of nitro (*—NO$_2$), cyano (*—CN), trifluoromethyl (*—CF$_3$), trichloromethyl (*—CCl$_3$), and alkylsulfones (*—S(=O)$_2$R$^a$), wherein R$^a$ is an alkyl or aryl group comprising 1 to 10 carbons, and
each X' is an independent leaving group selected from the group consisting of fluoride, chloride, bromide, iodide, trifluoromethoxy (*—OCF$_3$), trichloromethoxy (*—OCCl$_3$), and trifluoromethanesulfonyl (*—OS(=O)$_2$CF$_3$), and
iii) one or more additives; and
heating the mixture with agitation at a temperature of about 150° C. to 300° C., thereby forming a melt composition suitable for forming an article, wherein the melt composition comprises a poly(aryl ether sulfone) having a repeat unit of formula (3):

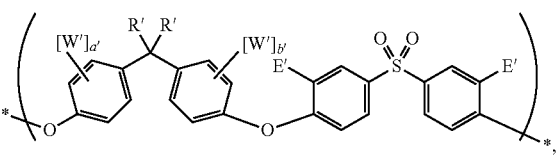

wherein
a' is an integer having a value of 0 to 4,
b' is an integer having a value of 0 to 4,
each E' is an independent electron withdrawing group selected from the group consisting of nitro (*—NO$_2$), cyano (*—CN), trifluoromethyl (*—CF$_3$), trichloromethyl (*—CCl$_3$), and alkylsulfones (*—S(=O)$_2$R$^a$), wherein R$^a$ is an alkyl or aryl group comprising 1 to 10 carbons,
each R' is an independent radical selected from the group consisting of alkyl groups comprising 1 to 6 carbons and haloalkyl groups comprising 1 to 6 carbons,
each W' is an independent monovalent radical selected from the group consisting of methyl, ethyl, methoxy, and ethoxy, and
the poly(aryl ether sulfone) and the one or more additives of the melt composition are associated by non-covalent interactions.

The above-described and other features and advantages of the present invention will be appreciated and understood by those skilled in the art from the following detailed description, drawings, and appended claims.

DETAILED DESCRIPTION

Figure 1:
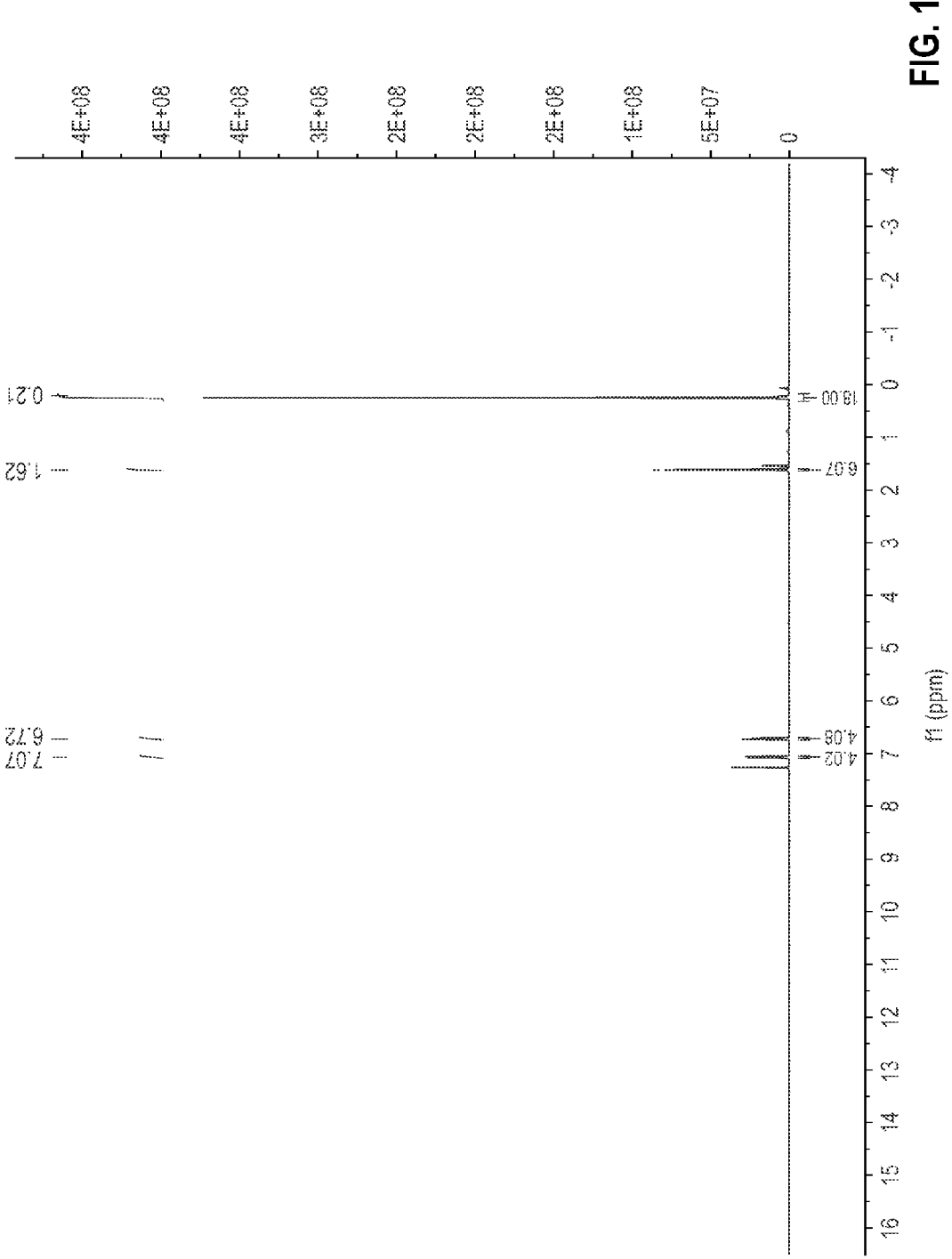
FIG. 1 is a $^1$H NMR spectrum of bis-TMS BPA.

The disclosed methods utilize reaction mixtures that are substantially free of, or free of, solvent, base, and catalyst for forming a poly(aryl ether sulfone). The poly(aryl ether sulfone)s are preferably formed by melt polymerizing two or more monomers capable of forming a linear poly(aryl ether sulfone) (PAES) at a temperature of 150° C. to 300° C. A linear poly(aryl ether sulfone) has two polymer chain end groups (i.e., dangling end groups) whereas a cyclic poly(aryl ether sulfone) has no polymer chain end groups. The poly(aryl ether sulfone) formed by the melt polymerization can be free of, or substantially free of, cyclic poly(aryl ether sulfone) derived from the two or more monomers. The poly(aryl ether sulfone)s are useful for molding, extrusion, and/or 3-dimensional printing applications.

The reaction mixture comprises:
i) a silylated bis-phenol (first monomer) of formula (1):

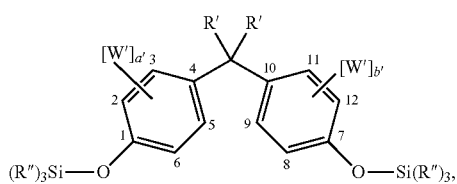

(1)

wherein
a' is an integer having a value of 0 to 4,
b' is an integer having a value of 0 to 4,
each W' is an independent monovalent radical selected from the group consisting of methyl, ethyl, methoxy, and ethoxy,
each R' is an independent radical selected from the group consisting of alkyl groups comprising 1 to 6 carbons, and haloalkyl groups comprising 1 to 6 carbons, and
each R" is an independent alkyl group comprising 1 to 6 carbons, and ii) a bis-aryl sulfone (second monomer) of formula (2):

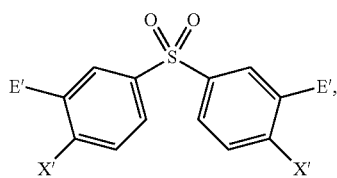

(2)

wherein
each E' is an independent electron withdrawing group selected from the group consisting of nitro (*—NO$_2$), cyano (*—CN), trifluoromethyl (*—CF$_3$), trichloromethyl (*—CCl$_3$), and alkylsulfones (*—S(=O)$_2$R$^a$), wherein R$^a$ is an alkyl or aryl group comprising 1 to 10 carbons, and
each X' is an independent leaving group selected from the group consisting of fluoride, chloride, bromide, iodide, trifluoromethoxy (*—OCF$_3$), trichloromethoxy (*—OCCl$_3$), and trifluoromethanesulfonyl (*—OS(=O)$_2$CF$_3$).

It should be understood that aromatic ring carbons labeled 2, 3, 5, 6, 8, 9, 11, or 12 that do not have a W' substituent are linked to a hydrogen substituent (i.e., when 0≤a'<4 and/or 0≤b'<4). Moreover, each of the substituents E', X', W', R', and/or R" can be present in the reaction mixture singularly or in combination with other respective substituents E', X', W', R', and/or R". In an embodiment, the reaction mixture comprises the first monomer and the second monomer in equimolar amounts. In an embodiment, the reaction mixture consists essentially of the first monomer and the second monomer in equimolar amounts.

Optionally, the reaction mixture can include one or more additives (e.g., reinforcing materials such as carbon nanotubes) to control the mechanical and/or physical properties of the poly(aryl ether sulfone). The additives can be present during the formation of the poly(aryl ether sulfone). Preferably, any additives are added to the reaction mixture after the polymerization. The one or more additives are non-covalently associated with the poly(aryl ether sulfone).

Preferably, the first monomer and the second monomer are combined in a vessel using anhydrous conditions and an inert, dry atmosphere (e.g., nitrogen). The mixture is heated with agitation at a temperature of 150° C. to 300° C. for 1 to 24 hours, thereby forming the poly(aryl ether sulfone). The poly(aryl ether sulfone) has a repeat unit of formula (3):

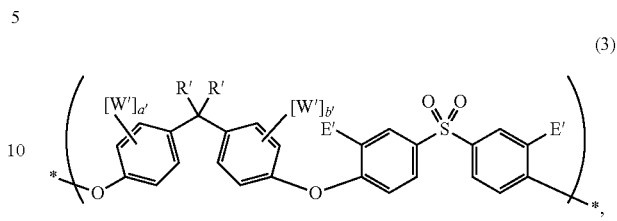

(3)

wherein
a' is an integer having a value of 0 to 4,
b' is an integer having a value of 0 to 4,
each E' is an independent electron withdrawing group selected from the group consisting of nitro (*—NO$_2$), cyano (*—CN), trifluoromethyl (*—CF$_3$), trichloromethyl (*—CCl$_3$), and alkylsulfones (*—S(=O)$_2$R$^a$), wherein R$^a$ is an alkyl or aryl group comprising 1 to 10 carbons,
each R' is an independent radical selected from the group consisting of alkyl groups comprising 1 to 6 carbons and haloalkyl groups comprising 1 to 6 carbons, and
each W' is an independent monovalent radical selected from the group consisting of methyl, ethyl, methoxy, and ethoxy.

As a preferred example, the first monomer is a compound having a structure wherein a' is 0, b' is 0, each R' is methyl, and each R" is methyl (i.e., (R")$_3$Si is a trimethyl silyl group) of formula (1), and the second monomer is a compound having a structure wherein each X' is fluoride and each E' is nitro of formula (2). In this example, the first monomer is 2,2-bis(4-trimethylsilyloxyphenyl)propane (bis-TMS BPA):

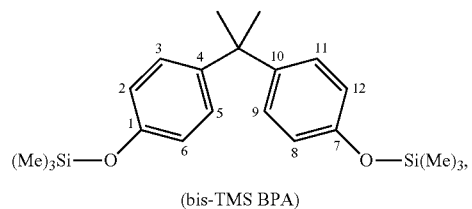

(bis-TMS BPA)

and the second monomer is bis(4-fluoro-3-nitrophenyl) sulfone (nitro-ArF):

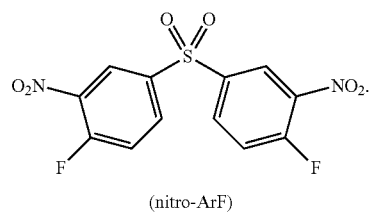 [SMILES: O=[N+]([O-])c1cc(S(=O)(=O)c2ccc(F)c([N+](=O)[O-])c2)ccc1F]

(nitro-ArF)

The melt polymerization of bis-TMS BPA with nitro-ArF proceeds with complete consumption of monomers at 190° C. within about 24 hours. The reaction produces trimethylsilyl fluoride (TMSF) as a gaseous byproduct, which can be condensed and recycled. The poly(aryl ether sulfone) product has a repeat unit of structure (A-1):

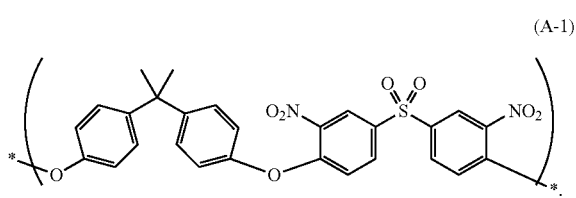

(A-1)

The poly(aryl ether sulfone) can have a number average molecular weight (Mn) of about 5,000 to about 30,000 g/mole, more specifically about 15,000 g/mole to about 20,000 g/mole as determined by gel permeation chromatography (GPC) versus polystyrene standards.

The poly(aryl ether sulfone) can have a polydispersity (PDI) of 1.0 to about 2.5, more specifically 1.0 to about 1.5, and even more specifically from about 1.0 to about 1.3. In an embodiment, the poly(aryl ether sulfone) has a polydispersity (PDI) of 1.1.

The poly(aryl ether sulfone) can have a glass transition temperature (Tg) of 190° C. to 240° C., more specifically 190° C. to 220° C. The glass transition temperature is determined by differential scanning calorimetry (DSC).

Optionally, the method can further comprise purifying the poly(aryl ether sulfone) (e.g., by washing the poly(aryl ether sulfone) with water and/or an organic solvent/water mixture). In an embodiment, the poly(aryl ether sulfone) is used without further purification.

The poly(aryl ether sulfone) has a first end group and a second end group. No restriction is placed on the structure of the end groups. Exemplary first and/or second end groups include *—X' and (R")Si—*, wherein R" and X' are defined as described above. The method can further comprise treating the poly(aryl ether sulfone) with water, thereby converting any trimethylsilylated aryl ether groups of the poly(aryl ether sulfone) to aryl alcohol groups. If desired, the aryl alcohol groups can be capped in the form of an alkyl or aryl ether using a suitable alkylating agent.

The poly(aryl ether sulfone)s have utility as components of compositions used to fabricate articles (e.g., medical devices). Articles can be three-dimensional (e.g., a cube), two-dimensional (e.g., a sheet film), and/or one dimensional (e.g., a fiber or thread). Non-limiting fabrication techniques include extrusion, molding, and/or 3-dimensional printing.

The poly(aryl ether sulfone) obtained by the above-described method can be used in a process of fabricating an article without isolating or further purifying the poly(aryl ether sulfone). The poly(aryl ether sulfone)s can be prepared on site for the fabrication of an article. In an embodiment, the poly(aryl ether sulfone) is a product of an on-site polymerization for manufacturing an article. As a non-limiting example, the poly(aryl ether sulfone) can be generated in a vessel as a melt, which is pumped directly to an extruder for fabricating an article. Additives, if any, can be combined with the poly(aryl ether sulfone) at the kettle and/or the extruder.

Herein, a melt composition for fabricating an article comprises a disclosed poly(aryl ether sulfone) and optionally, one or more additives. Exemplary additives include pigments, thermal stabilizers, ultraviolet light stabilizers, plasticizers, lubricants, mold release agents, chain terminating agents, fillers, reinforcing materials, antioxidants, foaming agents, fungicides, and combinations thereof. A melt composition temperature of about 200° C. to about 300° C. is generally preferred for article fabrication.

Non-limiting exemplary fillers include chalk, calcite, dolomite, mica, talc, wollastonite, silicon dioxide, glass spheres, glass powders, aluminum, alumina, aluminum hydroxide, aluminum nitride, boron nitride, clay, magnesium carbonate, kaolin, quartz, $TiO_2$, $ZrO_2$, zirconium phosphates, zirconium phosphonates, tungstic acid, molybdic acid, and combinations thereof.

Non-limiting exemplary reinforcing fibers include glass fibers, ceramic fibers, textile fibers, carbon fibers, carbon nanotubes, and combinations thereof.

Also disclosed is a method of forming a melt composition for fabricating an article. The method comprises i) forming a mixture comprising a monomer of formula (1), a monomer of formula (2), and one or more additives and ii) heating the mixture at a temperature of about 150° C. to about 300° C., thereby forming the melt composition comprising a poly (aryl ether sulfone) of formula (3) in non-covalent association with the one or more additives.

The following examples illustrate the formation of the disclosed poly(aryl ether sulfone)s.

EXAMPLES

Materials used in the following examples are listed in Table 1.

TABLE 1

| ABBREVIATION | DESCRIPTION | SUPPLIER |
|---|---|---|
| BPA | Bisphenol A | Sigma Aldrich |
| TMSCl | Trimethylsilyl chloride | Sigma Aldrich |
| TBAF | Tetrabutyl ammonium fluoride | Sigma Aldrich |
| BFPS | Bis(4-Fluorophenyl) Sulfone | Sigma Aldrich |
| CHP | N-Cyclohexyl-2-Pyrrolidone | Sigma Aldrich |
| DBU | 1,8-Diazabicyclo[5.4.0]undec-7-ene | Sigma Aldrich |
| TBD | 1,5,7-Triazabicyclo[4.4.0]dec-5-ene | Sigma Aldrich |
| NMI | N-Methyl Imidazole | Sigma Aldrich |
| IMID | Imidazole | Sigma Aldrich |
| DMPU | 1,3-Dimethyltetrahydropyrimidin-2(1H)-one | Sigma Aldrich |
| Bis-TMS BPA | Bis-Trimethylsilyl Bisphenol A | Prepared below |

Herein, Mn is the number average molecular weight, Mw is the weight average molecular weight, and MW is the molecular weight of one molecule.

Preparation of bis-TMS BPA.

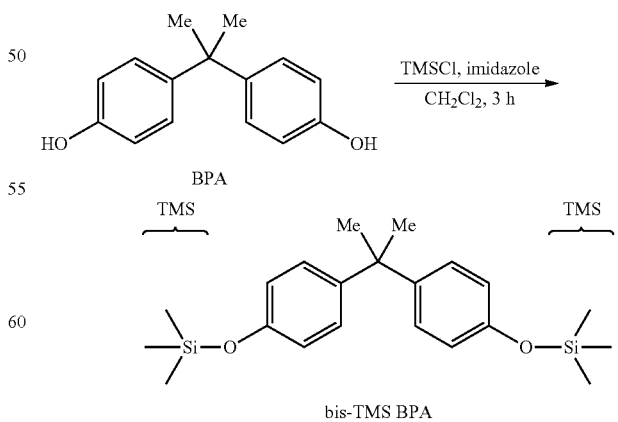

Figure 2:
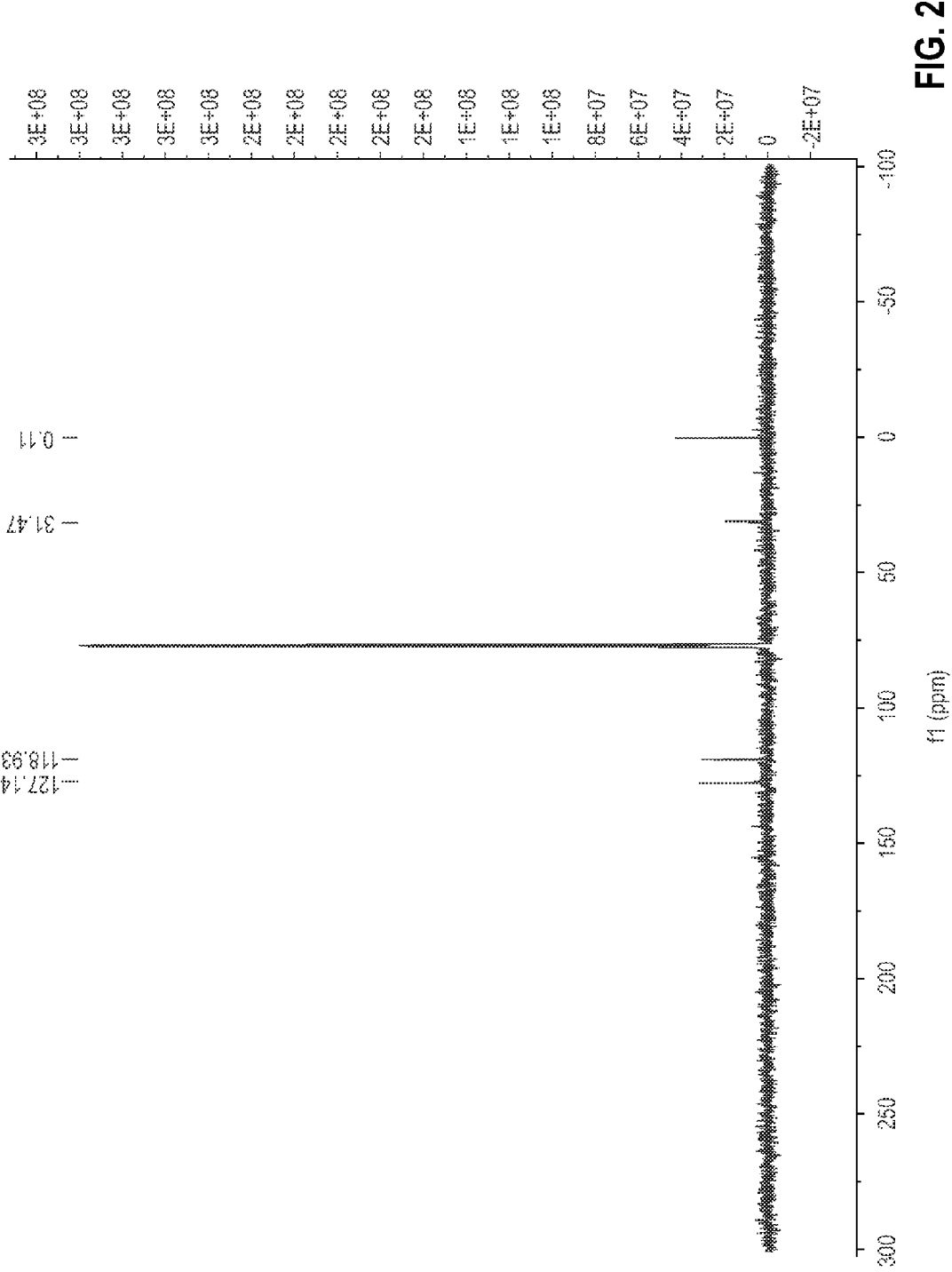
FIG. 2 is a $^{13}$C NMR spectrum of bis-TMS BPA.

Bisphenol A (BPA, 6.0 g, 26.3 mmol) was added to an oven-dried 250-mL flask equipped with stirbar. Dichloromethane (200 mL, 0.132 M) was added to the BPA and a stirred to form a suspension. Imidazole (2.6 g, 52.6 mmol) was then added in one portion at which time the solution became cloudy with a white precipitate. Chlorotrimethylsilane (6.69 ml, 5.71 g, 52.6 mmol) was added dropwise at room temperature and the solution became clouded further with a thick white precipitate. The cloudy solution was allowed to stir for one hour before diluting the mixture with hexanes, filtering, and concentrating the organics. The silyated phenol was then distilled away from the crude organics through the use of a Kugelrohr distillation apparatus at reduced pressure (20 torr) and 220° C. The clear and colorless oil was collected and weighed to yield bis TMS-protected BPA (8.65 g, 23.2 mmol, 88% yield) after distillation. $^1$H NMR (FIG. 1), 400 MHz, CDCl$_3$ (with solvent resonance as internal standard, 7.26 ppm): delta 7.08-7.05 (m, 4H), 6.74-6.70 (m, 4H), 1.62 (s, 6H), 0.21 (s, 18H). The $^{13}$C NMR spectrum of bis-TMS BPA is shown in FIG. 2.

Polymerizations

The following sulfone monomers were used for the polymerizations:

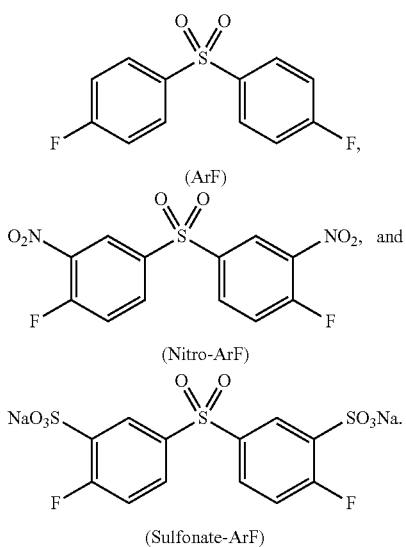

Example 1 (comparative), formation of polymer P-1. Polycondensation of bis-TMS BPA with bis(4-fluorophenyl)sulfone (ArF) catalyzed by 4 mole % tetrabutylammonium fluoride (TBAF).

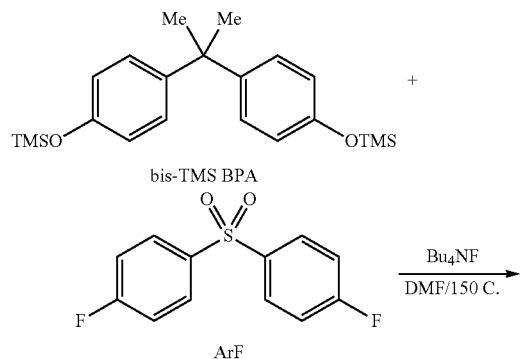

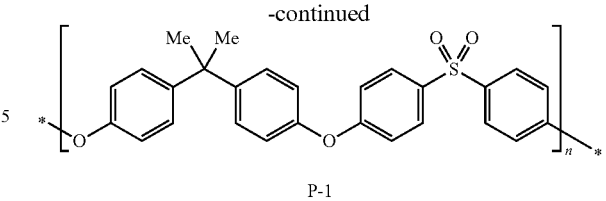

P-1

Bis-(4-fluorophenyl)sulfone (ArF, 0.0762 g, 0.3 mmol) and bis-TMS BPA (0.1118 g, 0.3 mmol) were combined in an oven-dried round bottom flask equipped with stirbar in a N$_2$-filled glovebox, followed by DMF (0.8 mL, 0.375 M with respect to bis-TMS BPA monomer), carefully rinsing any residual solids off the round-bottom glass walls into the reaction mixture. TBAF (0.0029 g, 0.012 mmol) was added by pipette and the round-bottom flask was fitted with a septum and removed from the glovebox. The reaction mixture was then heated using a heating mantle with stirring at 150° C. under a positive pressure of nitrogen for 24 hours. The product solution was allowed to cool and the polymer P-1 was precipitated into cold isopropanol, filtered, and the solids were collected to yield 0.103 g, 76% yield (Mw=21,604, Mn=5,288 PDI=1.97).

Examples 2-4 (comparative), formation of polymer P-2 to P-4, respectively. The procedure of Example 1 was repeated substituting TBAF with 5 mol % TBD (0.0021 g, 0.015 mmol), 5 mol % DBU (0.0022 g, 0.015 mmol), 10 mol % NMI (0.0025 g, 0.03 mmol), to form P-2 to P-4, respectively. The results are summarized in Table 2 further below.

Example 5 (comparative), formation of polymer P-5. Bis-TMS BPA (0.372 g, 1.0 mmol) and ArF (0.2542 g, 1.0 mmol) were added to a 2-Dram vial in a nitrogen-filled glovebox. NMP (3.0 g) and NaOH (0.090 g, 2.25 equivalent, 2.25 mmol) were added. The vial was removed from the glovebox, fitted with a septum with a nitrogen inlet and exit needle, and heated at 150° C. for 24 hours. The reaction mixture was allowed to cool, and the resulting brown solid was precipitated from dichloromethane into methanol and submitted for GPC analysis (Mw=8384, Mn=6076, PDI=1.38).

Example 6 (comparative), formation of polymer P-6. Bis-TMS BPA (0.372 g, 1.0 mmol) and ArF (0.2542 g, 1.0 mmol) were added to a 2-Dram vial in a nitrogen-filled glovebox. NMP (3.0 g) and DBU (0.024 g, 0.16 equivalent, 0.16 mmol) were added. The vial was removed from the glovebox, fitted with a septum with a nitrogen inlet and exit needle, and heated at 150° C. for 24 hours. The reaction mixture was allowed to cool, and the resulting brown solid was precipitated from dichloromethane into methanol and submitted for GPC analysis (Mw=2091, Mn=1714, PDI=1.22).

Example 7 (comparative), formation of polymer P-7. Bis-TMS BPA (0.372 g, 1.0 mmol) and ArF (0.2542 g, 1.0 mmol) were added to a 2-Dram vial in a nitrogen-filled glovebox. NMP (6.0 g) and DBU (0.024 g, 0.16 equivalent, 0.16 mmol) were added. The vial was removed from the glovebox, fitted with a septum with a nitrogen inlet and exit needle, and heated at 150° C. for 24 hours. The reaction mixture was allowed to cool, and the resulting brown solid was precipitated from dichloromethane into methanol and submitted for GPC analysis (Mw=5780, Mn=4250, PDI=1.36).

Example 8 (comparative), formation of polymer P-8. Bis-TMS BPA (0.372 g, 1.0 mmol) and ArF (0.2542 g, 1.0 mmol) were added to a 2-Dram vial in a nitrogen-filled glovebox. NMP (3.0 g) and DBU (0.012 g, 0.08 equivalent, 0.08 mmol) were added. The vial was removed from the glovebox, fitted with a septum with a nitrogen inlet and exit needle, and heated at 150° C. for 24 hours. The reaction mixture was allowed to cool, and the resulting brown solid was precipitated from dichloromethane into methanol and submitted for GPC analysis (Mw=4329, Mn=2857, PDI=1.48).

Example 9 (comparative), formation of polymer P-9. Bis-TMS BPA (0.372 g, 1.0 mmol), 0.1 g of 4-A molecular sieves (activated in an oven prior to use) and ArF (0.2542 g, 1.0 mmol) were added to a 2-Dram vial in a nitrogen-filled glovebox. NMP (3.0 g) and DBU (0.012 g, 0.08 equivalent, 0.08 mmol) were added. The vial was removed from the glovebox, fitted with a septum with a nitrogen inlet and exit needle, and heated at 150° C. for 24 hours. The reaction mixture was allowed to cool, and the resulting brown solid was precipitated from dichloromethane into methanol and submitted for GPC analysis (Mw=3296, Mn=2887, PDI=1.14).

Example 10 (comparative), formation of polymer P-10. Bis-TMS BPA (0.372 g, 1.0 mmol) and ArF (0.2542 g, 1.0 mmol) were added to a 2-Dram vial in a nitrogen-filled glovebox. NMP (3.0 g) and TBAF (0.018 g, 0.07 equivalent, 0.07 mmol) were added. The vial was removed from the glovebox, fitted with a septum with a nitrogen inlet and exit needle, and heated at 150° C. for 24 hours. The reaction mixture was allowed to cool, and the resulting brown solid was precipitated from dichloromethane into methanol and submitted for GPC analysis (Mw=4405, Mn=3311, PDI=1.33).

Example 11 (comparative), formation of polymer P-11. Bis-TMS BPA (0.372 g, 1.0 mmol) and ArF (0.2542 g, 1.0 mmol) were added to a 2-Dram vial in a nitrogen-filled glovebox. NMP (3.0 g) and K2CO3 (0.276 g, 2.0 equivalent, 2.0 mmol) were added. The vial was removed from the glovebox, fitted with a septum with a nitrogen inlet and exit needle, and heated at 150° C. for 24 hours. The reaction mixture was allowed to cool, and the resulting brown solid was precipitated from dichloromethane into methanol and submitted for GPC analysis (Mw=33128, Mn=13638, PDI=2.42).

Example 12 (comparative), formation of polymer P-12. Bis-TMS BPA (0.372 g, 1.0 mmol) and ArF (0.2542 g, 1.0 mmol) were added to a 2-Dram vial in a nitrogen-filled glovebox. NMP (3.0 g) and tetrakisdimethylaminoethylene (0.015 g, 0.07 equivalent, 0.07 mmol) were added. The vial was removed from the glovebox, fitted with a septum with a nitrogen inlet and exit needle, and heated at 190° C. for 48 hours. The reaction mixture was allowed to cool, and the resulting brown solid was precipitated from dichloromethane into methanol and submitted for GPC analysis (Mw=3180, Mn=2435, PDI=1.31).

Example 13 (comparative), formation of polymer P-13. Bis-TMS BPA (0.372 g, 1.0 mmol) and ArF (0.2542 g, 1.0 mmol) were added to a 2-Dram vial in a nitrogen-filled glovebox. CHP (1.5 g) and DBU (0.024 g, 0.16 equivalent, 0.16 mmol) were added. The vial was removed from the glovebox, fitted with a septum with a nitrogen inlet and exit needle, and heated at 190° C. for 24 hours. The reaction mixture was allowed to cool, and the resulting brown solid was precipitated from dichloromethane into methanol and submitted for GPC analysis (Mw=4167, Mn=2706, PDI=1.54).

Example 14 (comparative), formation of polymer P-14. Bis-TMS BPA (0.372 g, 1.0 mmol) and bis(4-fluoro-3-nitrophenyl) sulfone (Nitro-ArF, 0.3443 g, 1.0 mmol) were added to a 2-Dram vial in a nitrogen-filled glovebox. CHP (1.5 g) and DBU (0.024 g, 0.16 equivalent, 0.16 mmol) were added, and the vial warmed upon addition. The vial was removed from the glovebox, fitted with a septum with a nitrogen inlet and exit needle, and stirred at 22° C. for 24 hours. The reaction mixture was allowed to cool, and the resulting yellow solid was precipitated into methanol and submitted for GPC analysis (Mw=3238, Mn=2840, PDI=1.14)

Example 15 (comparative), formation of polymer P-15. Bis-TMS BPA (0.372 g, 1.0 mmol) and Nitro-ArF (0.3443 g, 1.0 mmol) were added to a 2-Dram vial in a nitrogen-filled glovebox. DBU (0.024 g, 0.16 equivalent, 0.16 mmol) was added and the reaction vessel became warm upon addition. The vial was removed from the glovebox, fitted with a septum with a nitrogen inlet and exit needle, and heated at 190° C. for 24 hours. The reaction mixture was allowed to cool, and the resulting yellow solid was precipitated into methanol and submitted for GPC analysis (Mw=27264, Mn=19786, PDI=1.40)

Example 16, formation of polymer P-16.

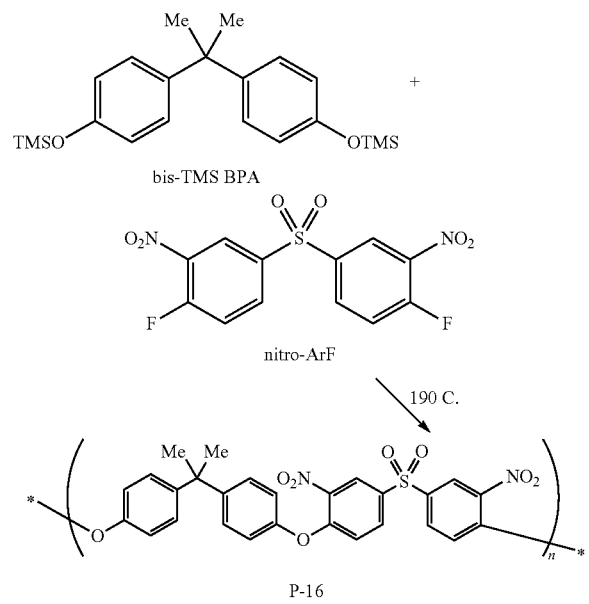

Bis-TMS BPA (0.372 g, 1.0 mmol) and Nitro-ArF (0.3443 g, 1.0 mmol) were added to a 2-Dram vial in a nitrogen-filled glovebox. The vial was removed from the glovebox, fitted with a septum with a nitrogen inlet and exit needle, and heated at 190° C. for 24 hours. The reaction mixture was allowed to cool, and the resulting yellow solid was submitted for GPC analysis without further purification (Mw=14305, Mn=12963, PDI=1.10)

Example 17 (comparative), formation of polymer P-17. Nitro-ArF (0.3443 g, 1.0 mmol) and bis-TMS BPA (0.3725 g, 1.0 mmol) and 3.0 g of CHP were combined in an oven-dried vial equipped with stirbar in a $N_2$-filled glovebox. The vial was fitted with a septum and removed from the glovebox. The reaction mixture was then heated using a heating mantle with stirring at 190° C. under a positive pressure of nitrogen for 18 hours. The product solution was allowed to cool and the polymer P-14 was subjected to GPC analysis (Mw=36,712, Mn=27,237 PDI=1.35).

Example 18 (comparative), formation of polymer P-18. 3,3'-Disulfonated-4,4'-difluorophenyl sulfone, disodium salt (purchased from Synquest and used as received), sulfonate-ArF, 0.2292 g, 0.5 mmol) and bis-TMS BPA (0.1863 g, 0.5 mmol) were combined in an oven-dried vial equipped with stirbar in a $N_2$-filled glovebox. The vial was fitted with a septum and removed from the glovebox. The reaction mixture was then heated using a heating mantle with stirring at 190° C. under a positive pressure of nitrogen for 24 hours. No polymer formed in this example.

Example 19 (comparative), formation of polymer P-19. 3,3'-Disulfonated-4,4'-difluorophenyl sulfone, disodium salt (sulfonate-ArF, 0.3627 g, 0.79 mmol) and bis-TMS BPA (0.2949 g, 0.79 mmol) and DMPU (1.0 mL) were combined in a vial equipped with stirbar on the benchtop. The reaction mixture was then heated using a heating mantle with stirring at 190° C. for 12 hours. The product solution was allowed to cool and the polymer P-16 was subjected to GPC analysis (Mw=5296, Mn=3954, PDI=1.3).

The polymer preparations are summarized in Table 2. Examples 1-15 and 17-19 are comparative examples. Example 16 demonstrates formation of a poly(aryl ether sulfone) formed without catalyst and solvent, which can be used for in situ generation of the poly(aryl ether sulfone) in the manufacture of articles. Trimethylsilyl fluoride (TMSF), the volatile byproduct of Example 16, can be trapped and recycled.

With respect to Examples 1 to 4, DBU and TBAF were the most efficient catalysts of Examples 1 to 4, yielding poly (aryl ether sulfone)s with the highest molecular weights ($M_n$=8,250 and 5,288 respectively).

The poly(aryl ether sulfone) of Example 16, which was prepared by melt polymerizing a mixture consisting essentially of alkylsilyl-protected bis-phenol and bis(4-fluoro-3-nitroaryl)sulfone, had the lowest PDI (1.1) and was free of cyclic polymer.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof. When a range is used to express a possible value using two numerical limits X and Y (e.g., a concentration of X ppm to Y ppm), unless otherwise stated the value can be X, Y, or any number between X and Y.

TABLE 2

| Ex. | Name | BPA monomer | Sulfone Monomer | Catalyst | Solvent | Conditions | Mn (eluent) | Mw | PDI | Cyclic polymer? (Y/N) |
|---|---|---|---|---|---|---|---|---|---|---|
| 1 (comp) | P-1 | bis-TMS BPA | ArF | 4 mol % TBAF | DMF | 165° C., 15 h | 5,288 | 10,832 | 1.97 | ND |
| 2 (comp) | P-2 | bis-TMS BPA | ArF | 5 mol % TBD | DMF | 165° C., 15 h | 4360 | 7296 | 1.67 | ND |
| 3 (comp) | P-3 | bis-TMS BPA | ArF | 5 mol % DBU | DMF | 165° C., 15 h | 8250 | 21604 | 2.61 | ND |
| 4 (comp) | P-4 | bis-TMS BPA | ArF | 5 mol % NMI | DMF | 165° C., 15 h | 4777 | 9544 | 1.99 | ND |
| 5 (comp) | P-5 | bis-TMS BPA | ArF | None | NMP | 2.25 eq. NaOH, 150° C., 24 h | 6076 (THF) | 8384 | 1.38 | Y |
| 6 (comp) | P-6 | bis-TMS BPA | ArF | 16 mol % DBU | NMP | 150° C., 24 h | 1714 (THF) | 2091 | 1.22 | N |
| 7 (comp) | P-7 | bis-TMS BPA | ArF | 16 mol % DBU | dilute NMP | 150° C., 24 h | 4250 (THF) | 5780 | 1.36 | Y |
| 8 (comp) | P-8 | bis-TMS BPA | ArF | 8.4 mol % DBU | NMP | 150° C., 24 h | 4239 (THF) | 4329 | 1.48 | Y |
| 9 (comp) | P-9 | bis-TMS BPA | ArF | 8.4 mol % DBU + 4A MS | NMP | 150° C., 24 h | 3296 (THF) | 3296 | 1.14 | N |
| 10 (comp) | P-10 | bis-TMS BPA | ArF | 7 mol % TBAF | NMP | 150° C., 24 h | 4405 (THF) | 4405 | 1.33 | Y |
| 11 (comp) | P-11 | BPA | ArF | None | None | 2 equiv $K_2CO_3$ | 13638 (THF) | 13638 | 2.42 | Y |
| 12 (comp) | P-12 | bis-TMS BPA | ArF | 7.5 mol % tetrakis dimethylamino-ethylene | NMP | 190° C., 48 h | 2435 (THF) | 3180 | 1.31 | Y |
| 13 (comp) | P-13 | bis-TMS BPA | ArF | DBU | conc CHP | 190° C., 24 h | 2706 (THF) | 4167 | 1.54 | Y |
| 14 (comp) | P-14 | bis-TMS BPA | Nitro-ArF | DBU | conc CHP | 22° C., 24 h | 2840 (THF) | 3238 | 1.14 | N |
| 15 (comp) | P-15 | bis-TMS BPA | Nitro-ArF | DBU | Neat | 190° C., 24 h | 19786 (DMF) | 27264 | 1.40 | ND |
| 16 | P-16 | bis-TMS BPA | Nitro-ArF | None | Neat | 190° C., 24 h | 12963 (DMF) | 14305 | 1.10 | N |
| 17 (comp) | P-17 | bis-TMS BPA | Nitro-ArF | 10 mol % DBU | CHP | 190° C., 16 h | 27,237 | 36,712 | 1.35 | ND |
| 18 (comp) | P-18 | bis-TMS BPA | sulfonate ArF | None | Neat | 190° C., 24 h | No polymer forms | NA | NA | NA |
| 19 (comp) | P-19 | Bis-TMS BPA | Sulfonate ArF | None | DMPU | 190° C., 12 h | 3954 | 5296 | 1.3 | ND |

ND = Not Determined
NA = Not Applicable

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and their practical application, and to enable others of ordinary skill in the art to understand the invention.

What is claimed is:

1. A method, comprising:
   forming a first mixture comprising:
   i) a silylated bis-phenol (first monomer) of formula (1):

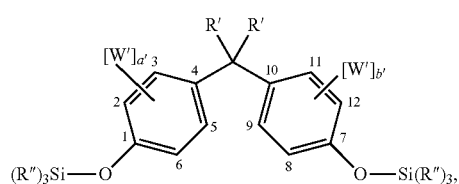

wherein
   aromatic carbons of formula (1) are labeled 1-12,
   a' is an integer having a value of 0 to 4,
   b' is an integer having a value of 0 to 4,
   each W' is an independent monovalent radical selected from the group consisting of methyl, ethyl, methoxy, and ethoxy,
   each R' is an independent radical selected from the group consisting of alkyl groups comprising 1 to 6 carbons and haloalkyl groups comprising 1 to 6 carbons, and
   each R" is an independent alkyl group comprising 1 to 6 carbons, and
   ii) a bis-aryl sulfone (second monomer) of formula (2):

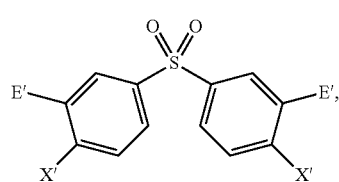

wherein
   each E' is an independent electron withdrawing group selected from the group consisting of nitro (*—NO$_2$), cyano (*—CN), trifluoromethyl (*—CF$_3$), trichloromethyl (*—CCl$_3$), and alkylsulfones (*—S(=O)$_2$R$^a$), wherein R$^a$ is an alkyl or aryl group comprising 1 to 10 carbons, and
   each X' is an independent leaving group selected from the group consisting of fluoride, chloride, bromide, iodide, trifluoromethoxy (*—OCF$_3$), trichloromethoxy (*—OCCl$_3$), and trifluoromethanesulfonyl (*—OS(=O)$_2$CF$_3$); and
   heating the first mixture with agitation at a temperature of about 150° C. to 300° C., thereby forming a second mixture comprising a linear poly(aryl ether sulfone);
   wherein the first mixture is free of solvent, base, and catalyst for preparing the poly(aryl ether sulfone).

2. The method of claim 1, wherein the linear poly(aryl ether sulfone) has a repeat unit of formula (3):

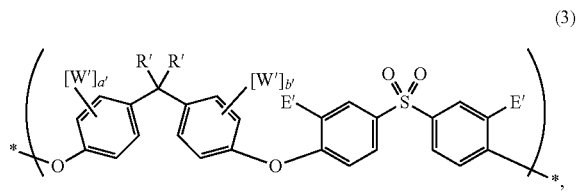

wherein
   a' is an integer having a value of 0 to 4,
   b' is an integer having a value of 0 to 4,
   each E' is an independent electron withdrawing group selected from the group consisting of nitro (*—NO$_2$), cyano (*—CN), trifluoromethyl (*—CF$_3$), trichloromethyl (*—CCl$_3$), and alkylsulfones (*—S(=O)$_2$R$^a$), wherein R$^a$ is an alkyl or aryl group comprising 1 to 10 carbons,
   each R' is an independent radical selected from the group consisting of alkyl groups comprising 1 to 6 carbons and haloalkyl groups comprising 1 to 6 carbons, and
   each W' is an independent monovalent radical selected from the group consisting of methyl, ethyl, methoxy, and ethoxy.

3. The method of claim 1, wherein the first mixture comprises equimolar amounts of the first monomer and the second monomer.

4. The method of claim 1, wherein the second mixture is free of, or substantially free of, a cyclic poly(aryl ether sulfone).

5. The method of claim 1, wherein the poly(aryl ether sulfone) has a repeat unit of structure (A-1):

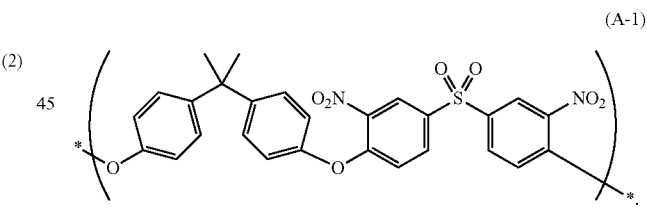

6. The method of claim 1, wherein the method further comprises collecting a gaseous trialkylsilyl byproduct while the first mixture is heated.

7. The method of claim 1, wherein a'=0 and b'=0 of the first monomer, and each of aromatic carbons labeled 2, 3, 5, 6, 8, 9, 11, and 12 of the first monomer is linked to a hydrogen.

8. The method of claim 1, wherein each R' of the first monomer is a methyl group.

9. The method of claim 1, wherein each R" of the first monomer is a methyl group.

10. The method of claim 1, wherein each E' of the second monomer is a nitro group.

11. The method of claim 1, wherein each X' of the second monomer is a fluoride group.

12. The method of claim 1 wherein the first monomer is bis-TMS BPA:

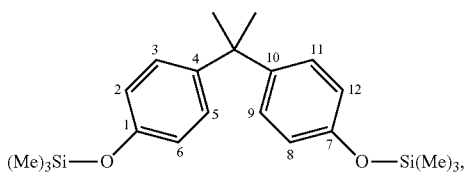

wherein aromatic carbons of bis-TMS-BPA are labeled 1-12.

13. The method of claim 1 wherein the second monomer is nitro-ArF:

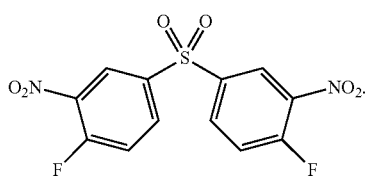 [SMILES: O=[N+]([O-])c1cc(S(=O)(=O)c2ccc(F)c([N+](=O)[O-])c2)ccc1F]

14. The method of claim 1, wherein the poly(aryl ether sulfone) has a polydispersity index (PDI) of 1.0 to about 1.3.

15. The method of claim 1, wherein the poly(aryl ether sulfone) has a number average molecular weight (Mn) of about 5000 to about 20000.

16. The method claim 1, wherein the second mixture is suitable for use in a 3-dimensional printer.

17. The method of claim 1, further comprising:
shaping the second mixture at a temperature effective in forming an article comprising the poly(aryl ether sulfone).

18. The method of claim 17, wherein the article is a medical device.

19. The method of claim 1, further comprising:
adding one or more additives to the second mixture, thereby forming a melt composition, wherein the one or more additives and the poly(aryl ether sulfone) are associated by non-covalent interactions in the melt composition; and
shaping the melt composition at a temperature effective in forming an article comprising the poly(aryl ether sulfone).

20. The method of claim 19, wherein the one or more additives include carbon nanotubes.

21. A method, comprising:
forming a mixture comprising:
i) a silylated bis-phenol (first monomer) of formula (1):

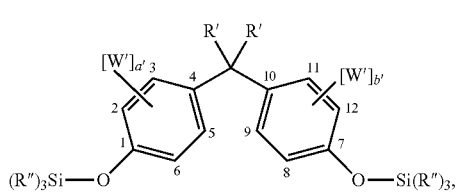

wherein
aromatic carbons of formula (1) are labeled 1-12,
a' is an integer having a value of 0 to 4,
b' is an integer having a value of 0 to 4,
each W' is an independent monovalent radical selected from the group consisting of methyl, ethyl, methoxy, and ethoxy, each R' is an independent radical selected from the group consisting of alkyl groups comprising 1 to 6 carbons and haloalkyl groups comprising 1 to 6 carbons, and
each R'' is an independent alkyl group comprising 1 to 6 carbons,
ii) a bis-aryl sulfone (second monomer) of formula (2):

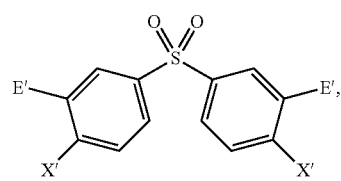

wherein
each E' is an independent electron withdrawing group selected from the group consisting of nitro (*—$NO_2$), cyano (*—CN), trifluoromethyl (*—$CF_3$), trichloromethyl (*—$CCl_3$), and alkylsulfones (*—$S(=O)_2R^a$), wherein $R^a$ is an alkyl or aryl group comprising 1 to 10 carbons, and
each X' is an independent leaving group selected from the group consisting of fluoride, chloride, bromide, iodide, trifluoromethoxy (*—$OCF_3$), trichloromethoxy (*—$OCCl_3$), and trifluoromethanesulfonyl (*—$OS(=O)_2CF_3$), and
iii) one or more additives; and
heating the mixture with agitation at a temperature of about 150° C. to 300° C., thereby forming a melt composition suitable for forming an article, wherein the melt composition comprises a linear poly(aryl ether sulfone) having a repeat unit of formula (3):

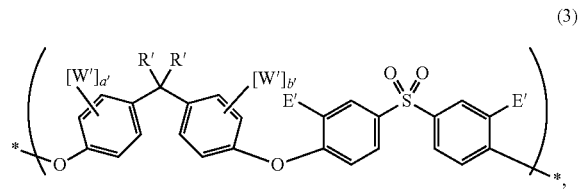

wherein
a' is an integer having a value of 0 to 4,
b' is an integer having a value of 0 to 4,
each E' is an independent electron withdrawing group selected from the group consisting of nitro (*—$NO_2$), cyano (*—CN), trifluoromethyl (*—$CF_3$), trichloromethyl (*—$CCl_3$), and alkylsulfones (*—$S(=O)_2R^a$), wherein $R^a$ is an alkyl or aryl group comprising 1 to 10 carbons,
each R' is an independent radical selected from the group consisting of alkyl groups comprising 1 to 6 carbons and haloalkyl groups comprising 1 to 6 carbons,
each W' is an independent monovalent radical selected from the group consisting of methyl, ethyl, methoxy, and ethoxy, and
the linear poly(aryl ether sulfone) and the one or more additives of the melt composition are associated by non-covalent interactions;

wherein the mixture is free of solvent, base, and catalyst for preparing the poly(aryl ether sulfone).

* * * * *